(12) United States Patent
Araki et al.

(10) Patent No.: US 7,671,939 B2
(45) Date of Patent: Mar. 2, 2010

(54) LIQUID CRYSTAL DISPLAY ELEMENT

(75) Inventors: Toshio Araki, Kikuchi-gun (JP);
Makoto Hirakawa, Kikuchi-gun (JP);
Tomoki Nakamura, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 477 days.

(21) Appl. No.: 11/615,169

(22) Filed: Dec. 22, 2006

(65) Prior Publication Data

US 2007/0146620 A1 Jun. 28, 2007

(30) Foreign Application Priority Data

Dec. 23, 2005 (JP) ............................. 2005-371173
Sep. 5, 2006 (JP) ............................. 2006-240198

(51) Int. Cl.
*G02F 1/1333* (2006.01)
(52) U.S. Cl. ...................... 349/111; 349/122; 349/156
(58) Field of Classification Search ................. 349/42, 349/110, 11, 122, 155, 156, 111; 345/87, 345/92
See application file for complete search history.

(56) References Cited

U.S. PATENT DOCUMENTS 4,867,537 A * 9/1989 Aoki et al. .................. 349/111

2006/0238693 A1* 10/2006 Yoon ......................... 349/155

FOREIGN PATENT DOCUMENTS

| CN | 1258357 A | 6/2000 |
| JP | 2003-280007 | 10/2003 |
| JP | 2004-198960 | 7/2004 |
| JP | 2004-264606 | 9/2004 |

* cited by examiner

*Primary Examiner*—Dung Nguyen
*Assistant Examiner*—Tai Duong
(74) *Attorney, Agent, or Firm*—Oblon, Spivak, McClelland, Maier & Neustadt, L.L.P.

(57) ABSTRACT

A liquid crystal display element includes: a first substrate having a first surface and including a pixel electrode; a second substrate having a second surface opposing to the first surface, and including a light-shielding film, a thickness adjusting film and a counter electrode arranged in sequence in a direction to the second surface; a sealing material having a frame-shape to bond the first substrate and the second substrate; a liquid crystal layer provided in a region surrounded by the sealing material and between the first substrate and the second substrate, wherein the thickness adjusting film is provided to cover the light-shielding film to define the thickness of the liquid crystal layer, and has a contact hole, wherein the counter electrode is provided to oppose to the pixel electrode, and electrically connected to the light shielding film via the contact hole.

11 Claims, 7 Drawing Sheets

LIQUID CRYSTAL DISPLAY ELEMENT

CROSS-REFERENCE TO RELATED APPLICATIONS

This application is based upon and claims the benefit of priority from Japanese Patent Application No. 2005-371173 filed on Dec. 23, 2005, and Japanese Patent Application No. 2006-240198 filed on Sep. 5, 2006, the entire contents of which are incorporated herein by reference.

BACKGROUND OF THE INVENTION

1. Field

The present invention relates to a liquid crystal display element and in particular to a liquid crystal display element of the field sequential system.

2. Description of the Related Art

In recent years, a field sequential liquid crystal display element that does not require a color filter has been developed. In the field sequential system, light sources of three colors RGB are switched at high speed to provide a color display. Thus, the field sequential system does not use a color filter for a typical liquid crystal display element but uses a counter substrate including; a counter electrode containing a transparent conductive film; and a light-shielding film containing a Cr film. The counter electrode is extended to the exterior of a pixel region and electrically connected to an electrode and a wiring provided on the alley substrate.

Since fast response is required in the field sequential liquid crystal display element, a ferroelectric liquid crystal is used as a liquid crystal enclosed between a pair of substrates forming a liquid crystal display element. To enclose a liquid crystal, there has been known a manufacturing method including dropping a liquid crystal on one substrate, applying a sealing material on the periphery of the pair of substrates, laminating the pair of substrates, and curing the sealing material with heat or light to enclose a liquid crystal. In case a ferroelectric liquid crystal is used as a liquid crystal material, a liquid crystal layer between a pair of substrates forming a liquid crystal display element has an optimum thickness range of 1 to 3 μm which is smaller than that of a typical liquid crystal layer. Thus, in some cases, a spacer is arranged to keep uniform the thickness of a liquid crystal layer in a pixel region.

In the process of laminating a pair of substrates, in case the gap between the pair of substrates is small, the sealing material between the pair of substrates spreads and the uncured resin of the sealing material extends to a region where the liquid crystal is enclosed thus contaminating the liquid crystal and degrading the display quality. While this phenomenon does not occur when the viscosity of the sealing material is increased, the sealing material does not sufficiently squash at a time of laminating the pair of substrates; therefore, the gap on the periphery of the panel increases. This results in the difference in the liquid crystal layer between the periphery and center of the pixel region, thus causing uneven display (for example, see JP-A-2003-280007 (FIG. 6)). That is, reduction of the thickness of a liquid crystal layer than a typical thickness may cause the degrading of display quality or uneven display.

There has been a technique for reducing the thickness of a liquid crystal layer in a pixel region while maintaining good curing of a sealing material. In this technique, a liquid crystal layer thickness adjusting film is provided for adjusting the thickness of a liquid crystal layer in a region surrounded by a sealing material applied to the periphery of a counter substrate and forming thereon a counter electrode (for example, see JP-A-2003-264606 (FIG. 4)).

With the above approach, it is possible to avoid phenomenon concerning curing of a sealing material while reducing the thickness of a liquid crystal layer in a pixel region surrounded by the sealing material, but may cause a crosstalk. Use of this approach makes it necessary to form an insulating film serving as a liquid crystal layer thickness adjusting film between a light-shielding film and a counter electrode on a counter substrate. This is because the counter electrode is used to apply a voltage on a liquid crystal and is preferably provided at the top of layers (the remotest layer from a glass substrate) except an alignment layer, and a light-shielding film is preferably formed on a glass substrate from the viewpoint of adhesion to the base material and optimization of the reflection prevention effect.

While the aforementioned phenomenon is prevented by this structure, horizontal crosstalk may occur. Since the specific resistance of a transparent conductive film used for a counter electrode is about 0.00002 Ωcm and its thickness is a mere 0.1 μm, the resistance of the counter electrode is far from low. Thus, in a portion remote from the joint with an array substrate external to a pixel region, that is, near the center of the pixel region, the resistance component of the counter electrode is added between the pixel region and the array substrate, which may result in defective display called horizontal crosstalk. A transparent conductive film on a typical counter substrate is laminated on a low-resistance metal layer such as a light-shielding film thus suppressing horizontal crosstalk caused by an increase in the resistance component.

With the above approach, the laminating structure of a counter electrode and a light-shielding film in a pixel region is interrupted by the formation of an insulating film in the pixel region as the solution means. Thus, the low-conductive metal film in a light-shielding film does not fully contribute to the conductivity of the counter electrode. As a result, the counter electrode has high resistance thus causing horizontal crosstalk.

SUMMARY OF THE INVENTION

An object of the invention is to provide a liquid crystal display element having a structure where sealing formation is excellently performed on the periphery of a pixel region and the thickness of a liquid crystal layer is reduce, capable of suppressing the horizontal crosstalk and having a good display characteristic According to an aspect of the invention, a liquid crystal display element includes: a first substrate having a first surface and including a pixel electrode; a second substrate having a second surface opposing to the first surface, and including a light-shielding film, a thickness adjusting film and a counter electrode arranged in sequence in a direction to the second surface; a sealing material having a frame-shape to bond the first substrate and the second substrate; a liquid crystal layer provided in a region surrounded by the sealing material and between the first substrate and the second substrate, wherein the thickness adjusting film is provided to cover the light-shielding film to define the thickness of the liquid crystal layer, and has a contact hole, wherein the counter electrode is provided to oppose to the pixel electrode, and electrically connected to the light shielding film via the contact hole.

The liquid crystal display element according to the aspect of the invention has is advantageous in that the liquid crystal display element has a favorable display characteristic without liquid crystal contamination, improper peripheral gap or horizontal crosstalk while having a structure where the thickness of a liquid crystal layer in a pixel region is reduced by forming an insulating film in the pixel region of a counter substrate and forming a joint part of the transparent conductive film of the counter electrode and a light-shielding film.

DETAILED DESCRIPTION OF THE PREFERRED EMBODIMENT

Figure 1:
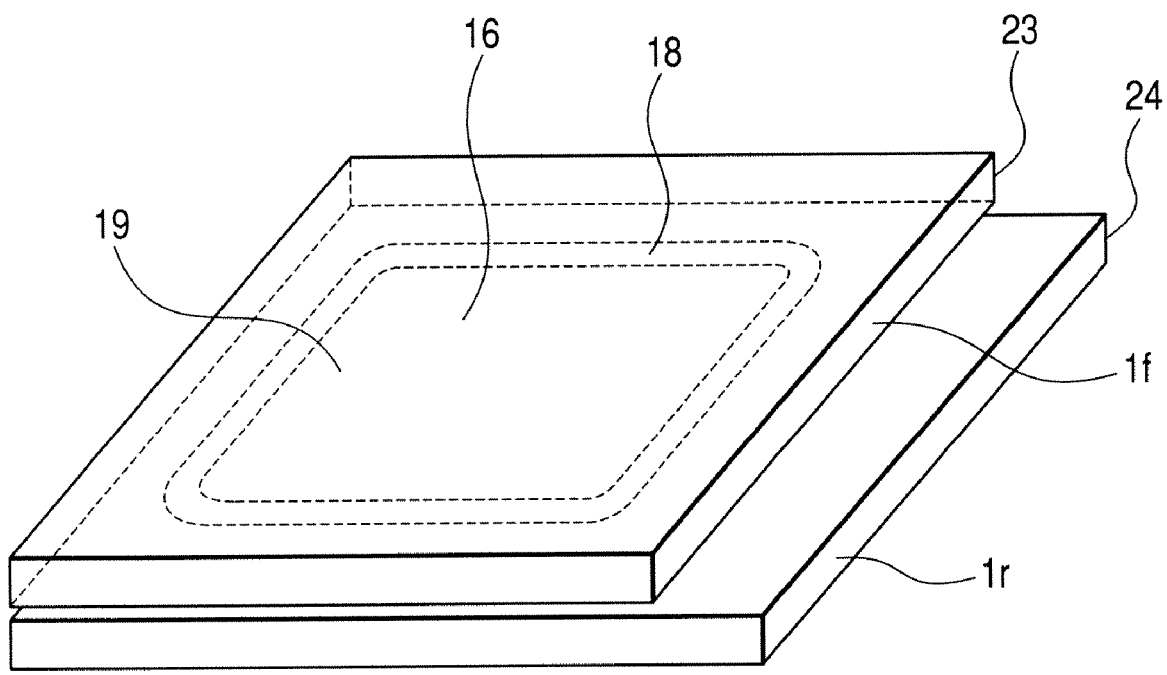
FIG. 1 is an external view of a liquid crystal display element according to an embodiment of the invention.

The external view of a liquid crystal display element according to an embodiment of the invention is shown in FIG. 1. The liquid crystal display element shown in FIG. 1 includes a rear substrate 24 as a first substrate positioned, and a front substrate 23 as a second substrate positioned on a front side of the rear substrate 24 viewed from the user. The rear substrate 24 and the front substrate 23 are laminated together via a sealing material formed in the shape of a frame between the pair of substrates. A liquid crystal 16 is enclosed in the region surrounded by the sealing material 18, the rear substrate 24 and the front substrate 23. The sealing material 18 is formed on the outer side of the pixel region 19. On an inner surface of the rear substrate 24 within the pixel region 19, TFT (Thin Film Transistor) described later is formed.

Figure 2A:
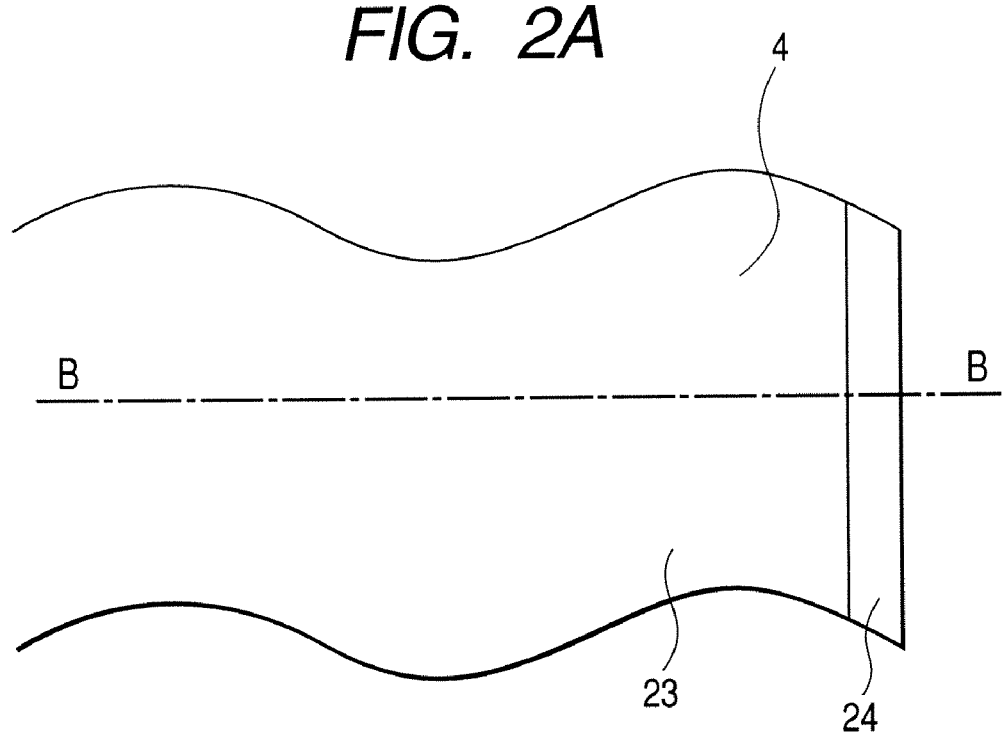
FIG. 2A is a plan view of a liquid crystal display element according to the embodiment of the invention near a sealing material.
Figure 2B:
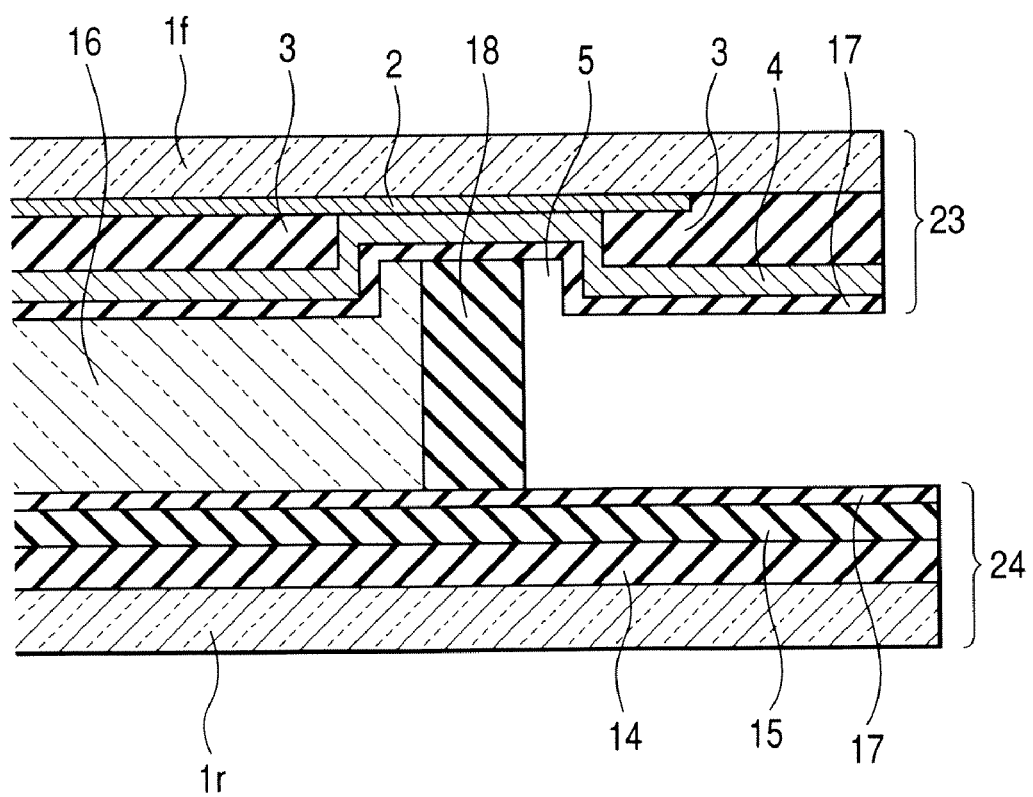
FIG. 2B is a cross sectional view taken along line B-B shown in FIG. 2A.

A plan view of the liquid crystal display element near the sealing material 18 is shown in FIG. 2A. A cross section of the front substrate 23 and rear substrate 24 taken along line B-B in FIG. 2A is shown in FIG. 2B.

The liquid crystal display element of the embodiment is used for a field sequential liquid crystal display element and does not include a color filter. The liquid crystal display element is an active matrix liquid crystal display element that uses a TFT as an active element. Basically, a pair of transparent glass substrates is joined via the sealing material 18. A liquid crystal layer 16 is enclosed in a region surrounded by the sealing part of the sealing material 18. In close proximity to a sealing material 18 on the inner surface of the glass substrate 1r of the rear substrate 24, a gate insulating film 14, a passivation film 15 and an alignment film 17 as components of a TFT described later are formed. On the inner surface of the glass substrate 1f of the front substrate 23, a light-shielding film 2 with electric conductivity formed of laminated layers respectively including for example chrome oxide (CrOx: x is a positive number) and chromium (Cr), a liquid crystal layer thickness adjusting film 3 (referred to as "thickness adjusting film") containing for example silicon nitride (SiNx: x is a positive number), a transparent conductive film 4 containing for example ITO (indium tin oxide) (hereinafter referred to as "ITO film", and the alignment film 17 are formed. A concave part 5 is formed in the thickness adjusting film 3 at a position where the sealing material 18 is formed.

Figure 3A:
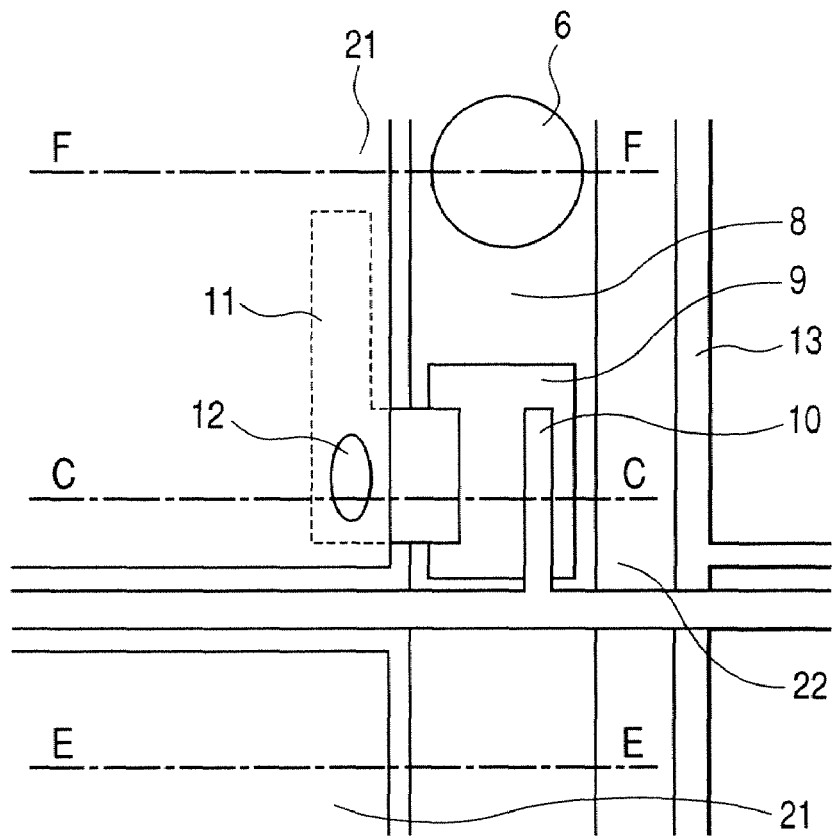
FIG. 3A is a plan view of the rear substrate of a liquid crystal display element according to the embodiment of the invention.
Figure 3B:
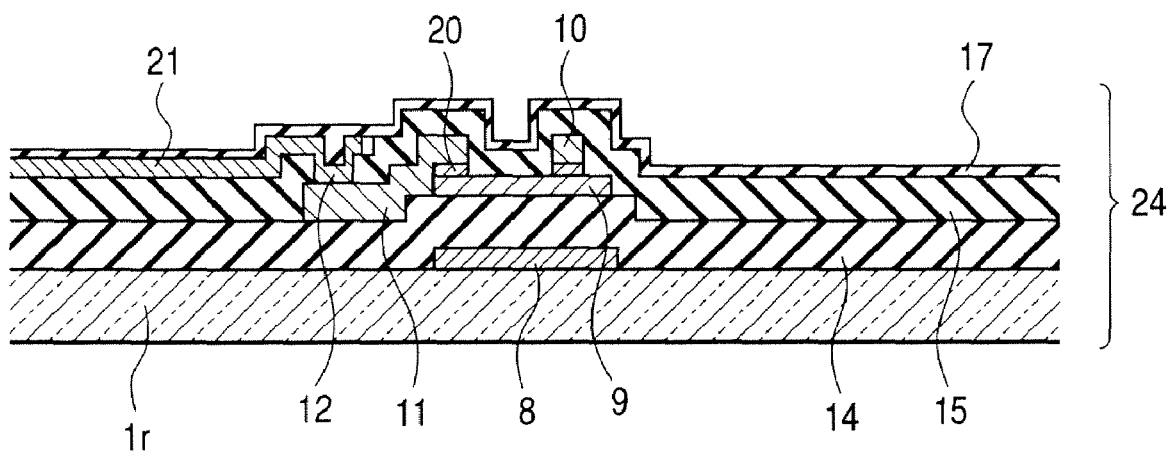
FIG. 3B is a cross sectional view taken along line C-C shown in FIG. 3A.

Next, the TFT and the pixel electrode provided on the inner surface of the rear substrate 24 will be described. A plan view of the rear substrate 24 where the TFT is formed as seen from the inner surface is shown in FIG. 3A. A cross section of the rear substrate 24 taken along line C-C in FIG. 3A is shown in FIG. 3B. Referring to FIGS. 3A) and 3B, the TFT 22 provided on the inner surface of the rear substrate 24 includes: common CS electrode wiring 13 and gate wiring 8 formed on the surface of the rear substrate 24; a transparent gate insulating film 14 formed across the entire region of the substrate while covering the gate wiring 8; an i-type semiconductor film 9 formed while being confronted with the gate wiring 8; a source electrode 10 and a drain electrode 11 formed on the i-type semiconductor film 9 via an n-type semiconductor film 20; and a passivation film 15 covering the i-type semiconductor film 9, the source electrode 10 and the drain electrode 11. In the passivation film 15, a TFT contact hole 12 is formed. Each of a plurality of pixel electrodes 21 contains a transparent conductive film such as an ITO and is formed on the passivation film 15. The pixel electrodes 21 are connected, at one end of the passivation film 15, to the drain electrode 11 of the TFT 22 corresponding to each of the pixel electrodes 21. The alignment film 17 is formed while covering the TFT 22 and the passivation film 15. On the gate wiring 8 on line F-F in FIG. 3A, a columnar spacer 6 is formed. Further, in the counter substrate (front substrate 23) positioned on the gate wiring 8 on line E-E in FIG. 3A, a contact hole 7 (not shown) is formed as described later.

Figure 4A:
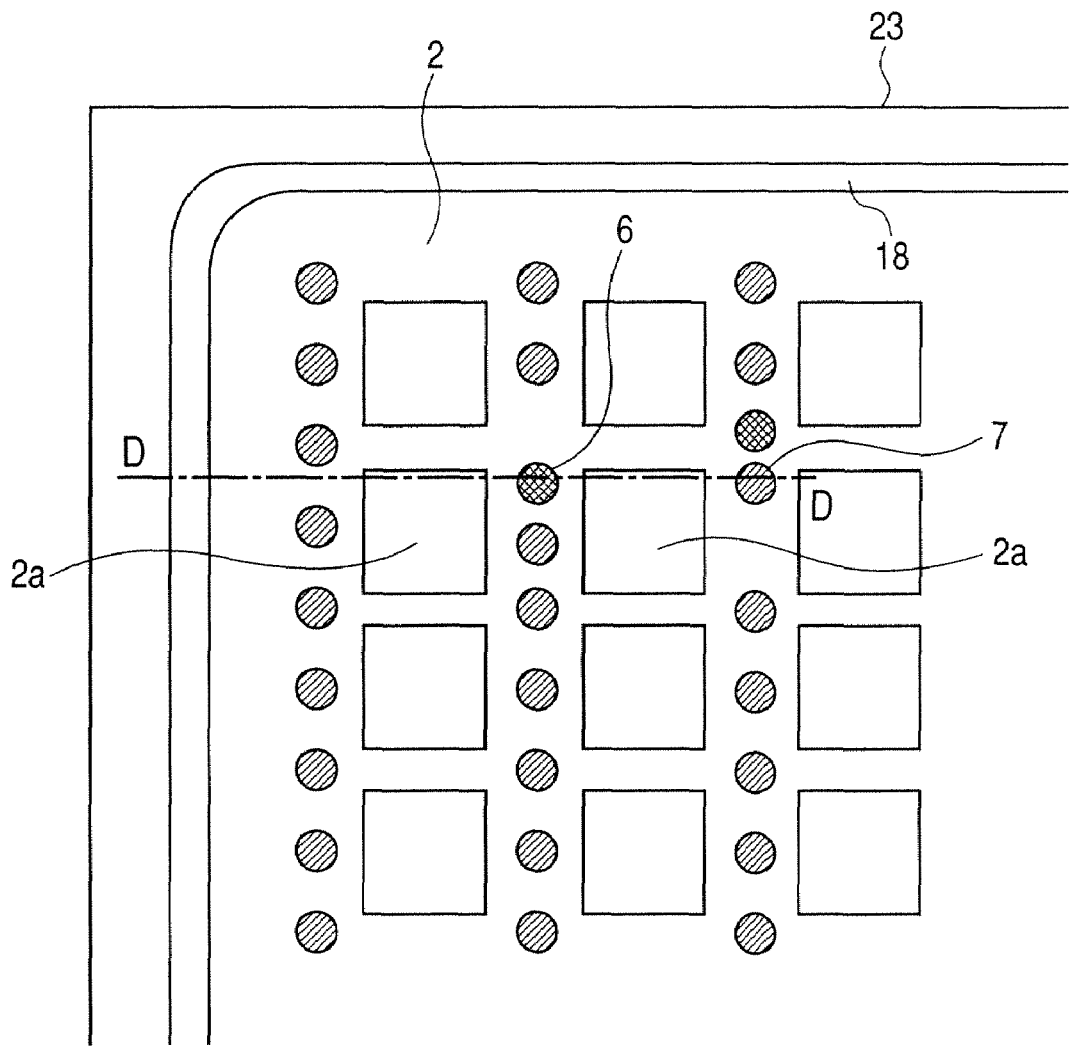
FIG. 4A is a plan view of the front substrate of a liquid crystal display element according to the embodiment of the invention.
Figure 4B:
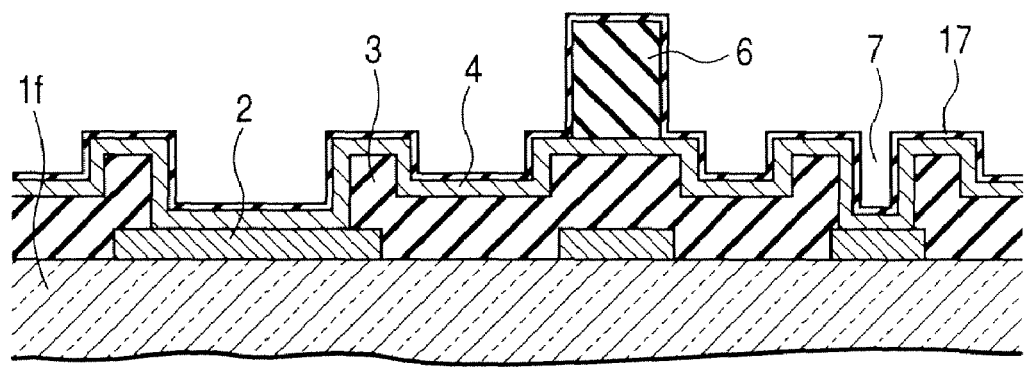
FIG. 4B is a cross sectional view taken along line D-D shown in FIG. 4A.

Next, the front substrate 23 will be described. A plan view of the front substrate 23 as seen from the inner surface is shown in FIG. 4A. A cross section of the front substrate 23 taken along line D-D in FIG. 4A is shown in FIG. 4B. Referring to FIG. 4A, the light-shielding film 2 of the rear substrate 24 has openings 2a punched in an almost rectangular shape at regions in correspondence to the respective pixel electrodes 21 arranged in a matrix shape. On the light-shielding film 2, the thickness adjusting film 3 containing a SiNx film is formed to cover the light-shielding film as shown in FIG. 4B. On the thickness adjusting film 3, is provided the ITO film 4 as a counter electrode. The ITO film 4 is electrically connected to the light-shielding film 2 via the contact hole 7 provided in the thickness adjusting film 3. The pattern of the light-shielding film 2 has a continuously linked shape except in the regions of the openings 2a. On the ITO film 4, the columnar spacer 6 containing a photosensitive resin film is formed. When the columnar spacer 6 overlaps the contact hole 7, it is difficult to keep uniform the thickness of the liquid crystal layer. The columnar spacer 6 is preferably formed at a region except where the contact hole 7 is formed, for example as shown in FIG. 4A. The alignment film 17 is applied and formed thereon.

Figure 5A:
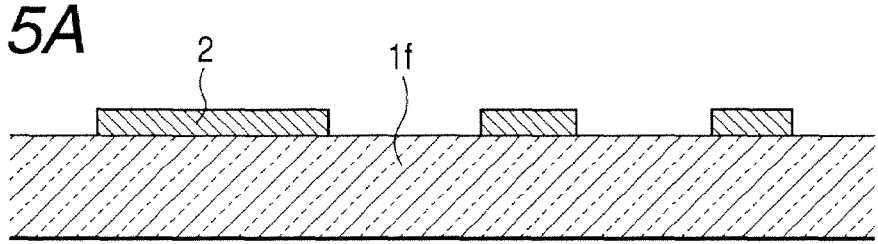
FIGS. 5A to 5E are cross sectional views showing the manufacturing process of the front substrate of a liquid crystal display element according to the embodiment of the invention.

Next, a method for manufacturing the front substrate 23 according to the embodiment of the invention will be described referring to FIGS. 5A to 5E. FIGS. 5A to 5E are process sectional view at sections corresponding to FIG. 4B. In FIG. 5A, a CrOx film of 10 nm thickness and a Cr film of 150 nm thickness are formed continuously on a glass substrate 1f with the sputtering method, and then a photoengraving process, etching, and a resist removing process are performed to form a pattern of the light-shielding film 2. In order to enhance the concentration of the light-shielding film 2 and improve the light-shielding effect, chrome nitride (CrNx) may be used instead of Cr to provide a laminate structure of CrOx and CrNx. In this case, it is possible to obtain a sufficient light-shielding effect by way of a reduced film thickness compared with Cr.

Figure 5B:
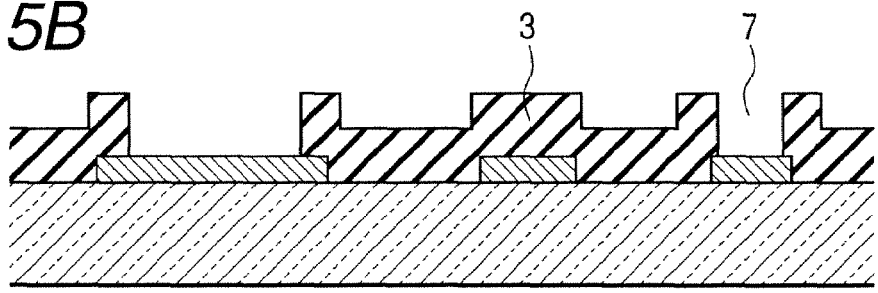

In FIG. 5B, a SiNx (silicon nitride) film of 700 nm thickness is formed. A photoengraving process, etching, and a resist removing process are performed to form the thickness adjusting film 3 and a contact hole 7. In this case, as shown in FIG. 2B, a SiNx film beneath the position where the sealing material 18 is to be formed may be removed to form the concave part 5.

Figure 5C:
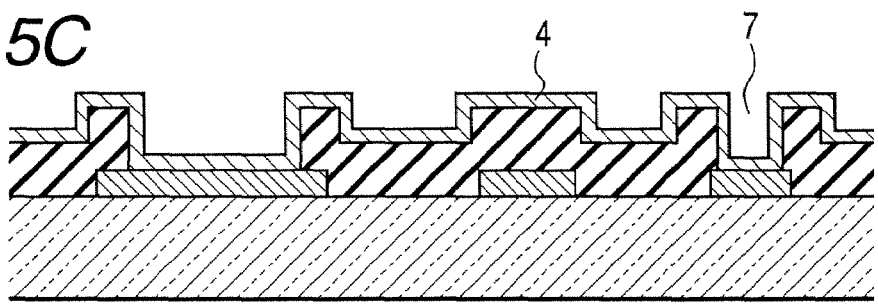

In FIG. 5C, the ITO film 4 as a counter electrode is formed on the entire surface by using the sputtering method. In this case, the electric resistance of the counter electrode can be reduced by forming the ITO film 4 so that the light-shielding film 2 and the ITO film 4 will be electrically conducted via the contact hole 7. For example, an entire part of the thickness adjusting film 3 on the light-shielding film 2 may be removed in order to increase the area of the contact hole 7 used to connect the light-shielding film 2 and the ITO film 4 although this approach results in an increase in the etching time and reduced productivity. In case the contact hole 7 is made like as this embodiment, it is possible to suppress an increase in the area used for etching and reduce the etching time. In a typical case, it suffices to form more than one contact hole 7 in order to reduce the electric resistance of the counter electrode.

Figure 5D:
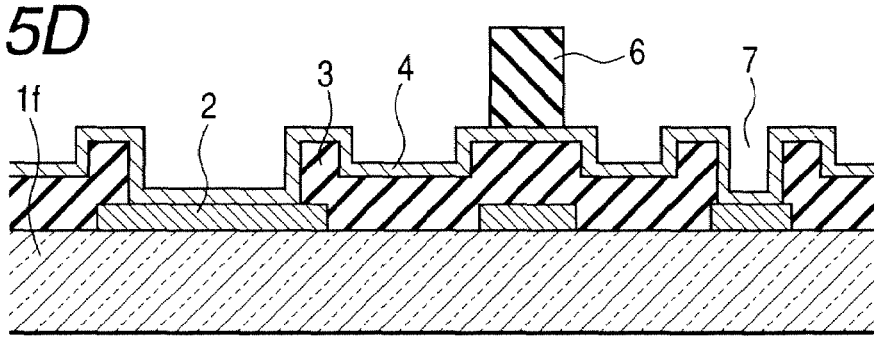
Figure 5E:
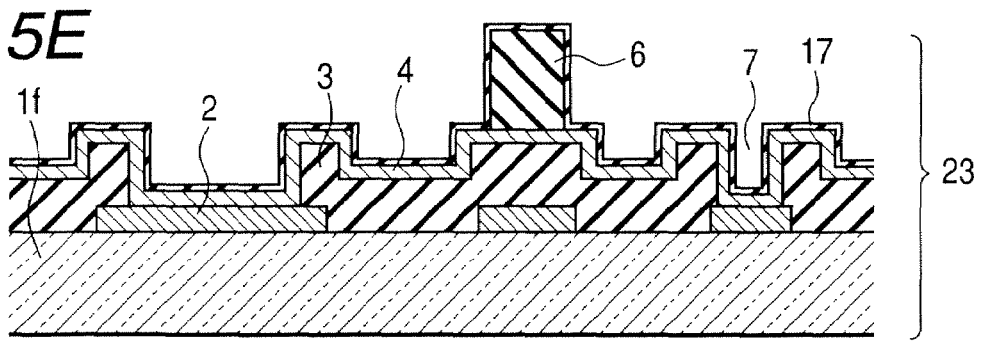

In FIG. 5D, a photosensitive resin film of about 2 μm thickness (not shown) is applied and a photoengraving process is performed, then a columnar spacer 6 having a predetermined height (for example 5 μm) is formed. The front substrate 23 includes at least one contact hole 7 for electrically connecting the ITO film 4 as a counter electrode and the light-shielding film 2 formed in the thickness adjusting film 3 in the display pixel region. In FIG. 5E, the alignment film 17 is applied and formed to complete the front substrate 23 according to the embodiment of the invention.

Figure 6A:
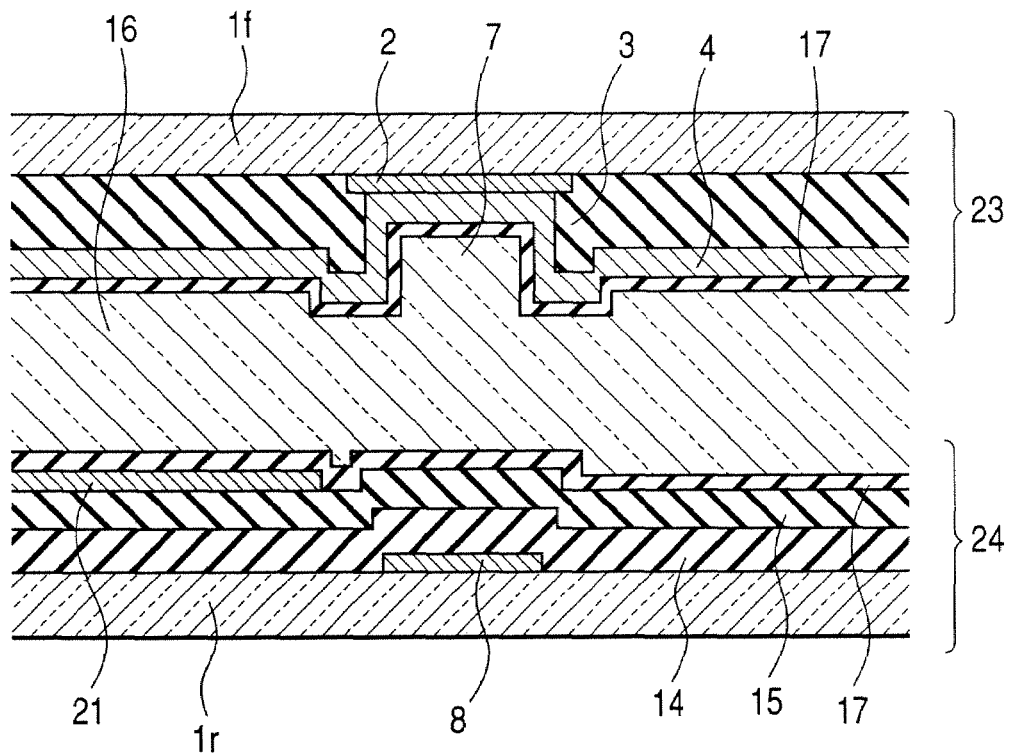
FIG. 6A is a cross sectional view of the front and rear substrates of a liquid crystal display element according to the embodiment of the invention taken along line E-E shown in FIG. 3A.

While the rear substrate 24 and the front substrate 23 have been described, in this example, a cross section of the front substrate 23 and the rear substrate 24 taken along line E-E in FIG. 3A is shown in FIG. 6A in order to define the positional relationship between the position of the contact hole 7 formed in the front substrate 23 and the TFT 22 formed in the rear substrate 24 assumed in case the two substrates are bonded to each other while confronted with each other by using the columnar spacer 6 and the sealing material 18 as shown in FIGS. 1, 2A and 2B. As shown in FIG. 3A and FIG. 6A, the contact hole 7 in the front substrate 23 is preferably formed opposite on the gate wiring 8 with flat surface on the rear substrate 24 rather than formed opposite on the TFT 22 having a distorted surface shape. This is because alignment control by the rubbing process on the alignment film 17 is assured.

Figure 6B:
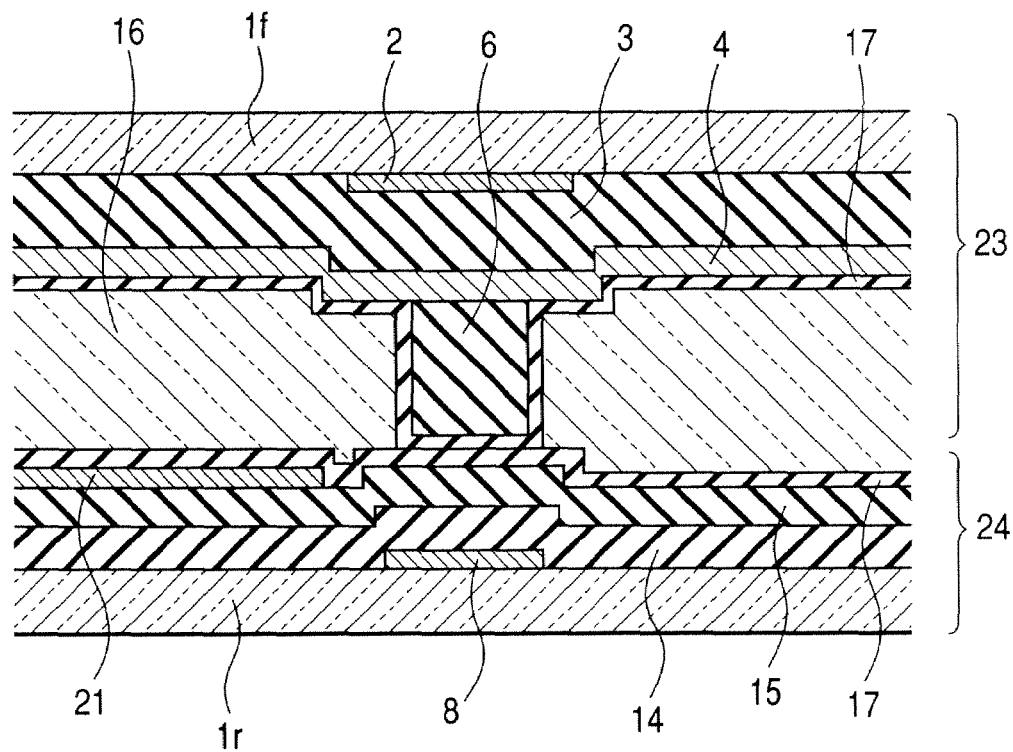
FIG. 6B is a cross sectional view taken along line F-F shown in FIG. 3A.

A cross section of the front substrate 23 and the rear substrate 24 taken along line F-F in FIG. 3A is shown in FIG. 6B in order to define the positional relationship between the position of the columnar spacer 6 of the front substrate 23 and the TFT 22. As shown in FIG. 3A and FIG. 6B, the columnar spacer 6 of the front substrate 23 is preferably formed opposite on the gate wiring 8 with flat surface on the rear substrate 24 rather than formed opposite on the TFT 22 having a distorted surface shape. This is because it is readily possible to control the liquid crystal layer thickness.

Figure 7:
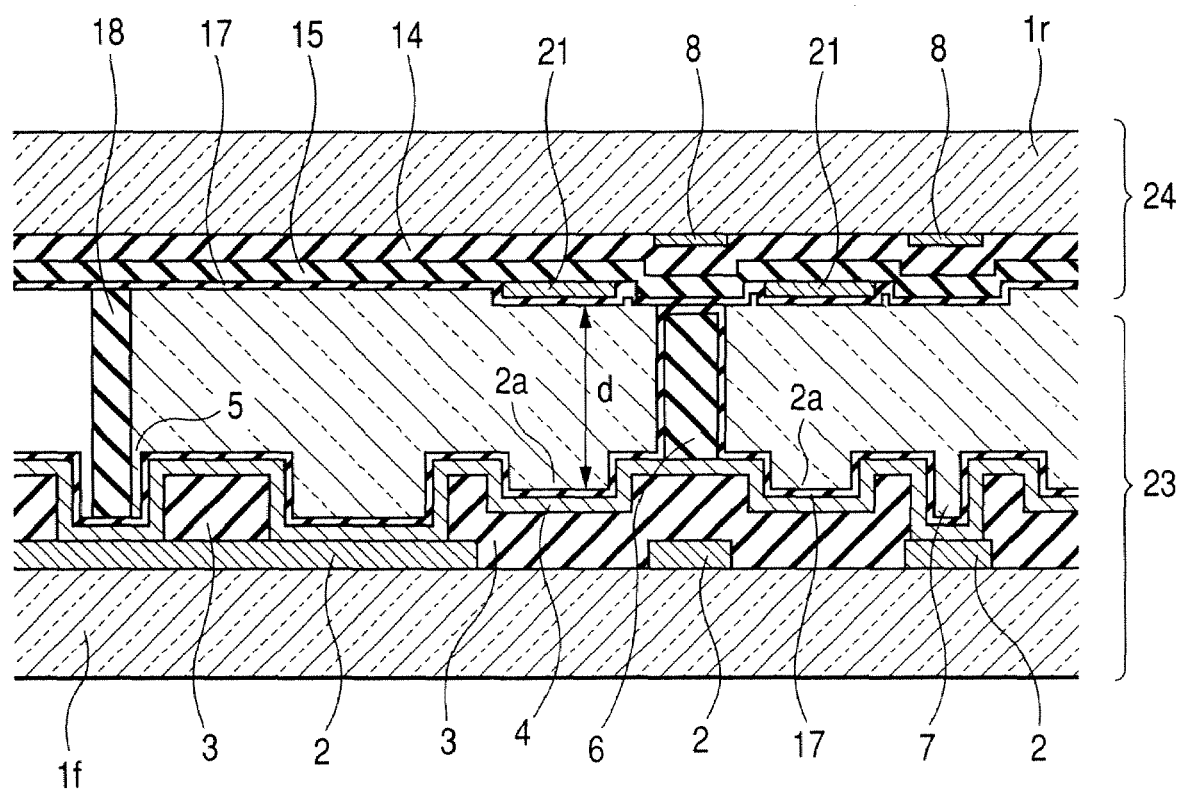
FIG. 7 is a cross sectional view of the front and rear substrates of a liquid crystal display element according to the embodiment of the invention taken along line D-D shown in FIG. 4A.

A cross section of the front substrate 23 and the rear substrate 24 taken along line D-D in FIG. 4A is shown in FIG. 7 in order to define the positional relationship between the opening 2a formed in the light-shielding film 2 of the front substrate 23 and the pixel electrode 21 of the rear substrate 24. The sealing material 18 holds the front substrate 23 and the rear substrate 24 as described above, and the columnar spacer 6 comes into contact with the inner surface of the rear substrate 24 to maintain the liquid crystal layer thickness. The contact hole 7 and the columnar spacer 6 are formed in separate positions to avoid overlapping. The pixel electrode 21 of the rear substrate 24 is formed in a position opposite to the opening 2a in the light-shielding film 2 of the front substrate 23. The thickness d of the liquid crystal layer 16 held in this position (distance between inner surfaces of the front substrate 23 and rear substrate 24: gap) is specified mainly with the sealing material 18 and the thickness adjusting film 3.

According to the result of measuring the electric resistance of the counter electrode assumed in case an electrical connection part is formed by the contact hole 7, the value obtained is on the order of one tenth or one hundredth the value obtained in the absence of the contact hole 7, that is, in case the counter electrode is formed by the ITO film 4 alone. In order to obtain a low electric resistance value than in a case where the counter electrode is formed by the ITO film 4 alone, the light-shielding film 2 is preferably formed of a material having a lower electric resistance value than that of the ITO film 4. It has been verified that a liquid crystal display element provided by forming the frame-shaped sealing material 18 between the front substrate 23 and the rear substrate 24 and bonding the substrates with the liquid crystal 16 enclosed therebetween is free from liquid crystal contamination or improper peripheral gap as well as defective display called horizontal crosstalk caused by an increase in the electric resistance of the counter electrode.

At least one contact hole 7 for electrically connecting the ITO film 4 as a counter electrode and the light-shielding film 2 is preferably formed in the thickness adjusting film 3 in the display pixel region. Further, as shown in FIG. 4A, at least one contact hole 7 is preferably formed in association with each of the plurality of pixel electrodes 21 in the display pixel region. In this case, the electric resistance values of individual counter electrodes (the light-shielding film 2, the ITO film 4) respectively corresponding to individual pixel electrodes 21 can be almost uniform in the display pixel region. It is thus possible to suppress uneven display caused by variations in display of the horizontal crosstalk as well as widen the margin of defective display.

While a SiNx film 700 nm thick is formed as the thickness adjusting film 3 in this embodiment, the invention is not limited thereto but another type of transparent insulating film, for example a SiOx film may be used. Or, a transparent insulating resin film may be applied to form the thickness adjusting film 3. In this case, it is possible to smooth the surface of the thickness adjusting film 3 so that at least the thickness of the liquid crystal layer 16 in the region opposite to the pixel electrodes 21 may be made uniform and uniform rubbing of the alignment film 17 is made possible, which improves the display quality. Further, by using a photosensitive resin, it is readily possible to form a contact hole 7 by using a photoengraving process.

A liquid crystal display element according to the embodiment of the invention has the thickness adjusting film 3 formed therein. Even in case the thickness of a liquid crystal layer in a pixel region 19 is small, the sealing material 18 is formed without liquid crystal contamination or improper peripheral gap. Further, the ITO film 4 and the light-shielding film 2 are electrically connected to each other via the contact hole 7 provided in the thickness adjusting film 3 in the pixel region 19, so that there is no fear of defective display caused by an increase in the resistance of a counter electrode.

What is claimed is:

1. A liquid crystal display element comprising:
   a first substrate including a first surface and a pixel electrode;
   a second substrate including a second surface opposing the first surface, a light-shielding film, a thickness adjusting film, and a counter electrode arranged in sequence in a direction from the second surface;
   a sealing material including a frame-shape to bond the first substrate and the second substrate;
   a liquid crystal layer provided in a region surrounded by the sealing material and between the first substrate and the second substrate,
   wherein the thickness adjusting film of the second substrate covers the light-shielding film, defines a boundary of the thickness of the liquid crystal layer, and includes a contact hole,
   wherein the counter electrode opposes the pixel electrode and is electrically connected to the light shielding film via the contact hole,
   wherein the first substrate further includes a thin-film transistor connected to the pixel electrode, and a gate wire and a source wire connected to the thin-film transistor that supplies a gate signal and a data signal thereto,
   wherein the second substrate further includes a columnar spacer provided on the counter electrode that contacts the first surface of the first substrate, and
   wherein the columnar spacer opposes the gate wire.

2. The liquid crystal display element according to claim 1, wherein the contact hole is arranged in a region surrounded by the sealing material.

3. The liquid crystal display element according to claim 1,
   wherein the first substrate includes a plurality of the pixel electrodes, and
   wherein the light-shielding film includes openings provided at regions opposing to the pixel electrodes.

4. The liquid crystal display element according to claim 3, wherein the light-shielding film has an electric conductivity and the pattern of the light-shielding film has a continuously linked shape except in the regions of the openings.

5. The liquid crystal display element according to claim 3, wherein the thickness adjusting film includes a plurality of the contact holes, and a number of the contact holes is equal to or above a number of the pixel electrodes.

6. The liquid crystal display element according to claim 1, wherein the contact hole is formed in a position where the contact hole does not overlap the columnar spacer.

7. The liquid crystal display element according to claim 1, wherein the contact hole is opposed to the gate wire.

8. The liquid crystal display element according to claim 5, wherein the plurality of contact holes reduces an electrical resistance of the counter electrode to one tenth or less of an electrical resistance of a counter electrode isolated from the light shielding film.

9. The liquid crystal display element according to claim 1,
   wherein the second substrate includes an alignment film located on top of the counter electrode in the direction from the second surface,
   wherein a first distance is a distance between the second surface and a location on the alignment film from which the columnar spacer extends towards the first substrate,
   wherein a second distance is a distance between the second surface of and a location on the alignment film that opposes the pixel electrode, and
   wherein the first distance is greater than the second distance.

10. The liquid crystal display element according to claim 1,
    wherein the first substrate includes a plurality of the pixel electrodes,
    wherein the second substrate includes a plurality of contact holes,
    wherein the light-shielding film of the second substrate includes openings provided at regions opposing to the pixel electrodes,
    wherein the columnar spacer is provided between two of the openings, and
    wherein each of the two openings is adjacent to one of the plurality of contact holes in a direction respectively opposite of the columnar spacer.

11. The liquid crystal display element according to claim 1, wherein a first thickness of the thickness adjusting film of the second substrate located directly adjacent to the contact hole is greater than a second thickness of the thickness adjusting film of the second substrate at a location opposed to the pixel electrode.

* * * * *